Feb. 23, 1926.

E. P. BULLARD, JR 1,574,726

MULTIPLE SPINDLE MACHINE TOOL

Filed Jan. 29, 1921     3 Sheets-Sheet 1

INVENTOR.
Edward P. Bullard, Jr.
BY
Chamberlain & Newman  ATTORNEYS.

Feb. 23, 1926.

E. P. BULLARD, JR 1,574,726

MULTIPLE SPINDLE MACHINE TOOL

Filed Jan. 29, 1921 3 Sheets-Sheet 2

INVENTOR.
Edward P. Bullard, Jr.
BY
Chamberlain & Newman ATTORNEYS.

Feb. 23, 1926.  1,574,726
E. P. BULLARD, JR
MULTIPLE SPINDLE MACHINE TOOL
Filed Jan. 29, 1921  3 Sheets-Sheet 3

INVENTOR.
Edward P. Bullard, Jr.
BY
Chamberlain & Newman ATTORNEYS.

Patented Feb. 23, 1926.

1,574,726

UNITED STATES PATENT OFFICE.

EDWARD P. BULLARD, JR., OF BRIDGEPORT, CONNECTICUT, ASSIGNOR TO THE BULLARD MACHINE TOOL CO., OF BRIDGEPORT, CONNECTICUT, A CORPORATION OF CONNECTICUT.

MULTIPLE-SPINDLE-MACHINE TOOL.

Application filed January 29, 1921. Serial No. 440,844.

*To all whom it may concern:*

Be it known that EDWARD P. BULLARD, Jr., a citizen of the United States, and resident of Bridgeport, in the county of Fairfield and State of Connecticut, has invented certain new and useful Improvements in Multiple-Spindle-Machine Tools, of which the following is a specification.

This invention relates to new and useful improvements in machine tools, employing a series of rotary work carrying spindles and a series of tool-slides to operate in conjunction with such work spindles.

The invention particularly refers to a novel type of machine employing a continuously driven rotary carrier on which a series of rotating work carrying spindles and an equal number of tool slides are mounted, in a manner to be carried therewith, and provided with means whereby the respective pieces of work when placed upon the spindles, will be rotatably carried thereon, and will be continuously operated upon by the tool slides so as to be completed within a single rotation of the carrier upon which all the spindles, work and slides are carried.

The present invention has for its objects to provide an automatic multiple spindle machine capable of rapid production, and for turning cylindrical work, such as motor pistons, fly-wheels and similar articles, of which large quantities of like sizes are required; to design a machine of the class specified which may be loaded and unloaded from one point, designated as the loading station, by a single operator, positioned adjacent thereto, and whereby work, when positioned on the machine, is carried away from the operator and around the machine while each of the tool-slides is gradually and continuously fed forward from the beginning to near the completion of each turn of the carrier; and further, to design and time the machine so that as each spindle and its tool-slide are brought back to the loading station, the operation upon the particular piece of work upon each said spindle will have been completed; to provide means for automatically withdrawing the tool-slides and disconnecting its coacting spindle when brought to the loading station to permit the work to be removed from the spindle and a new piece to be placed thereon while the carrier is still rotating.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Fig. 1 shows a front elevation of my improved form of multiple spindle metal turning machine.

Figure 1:
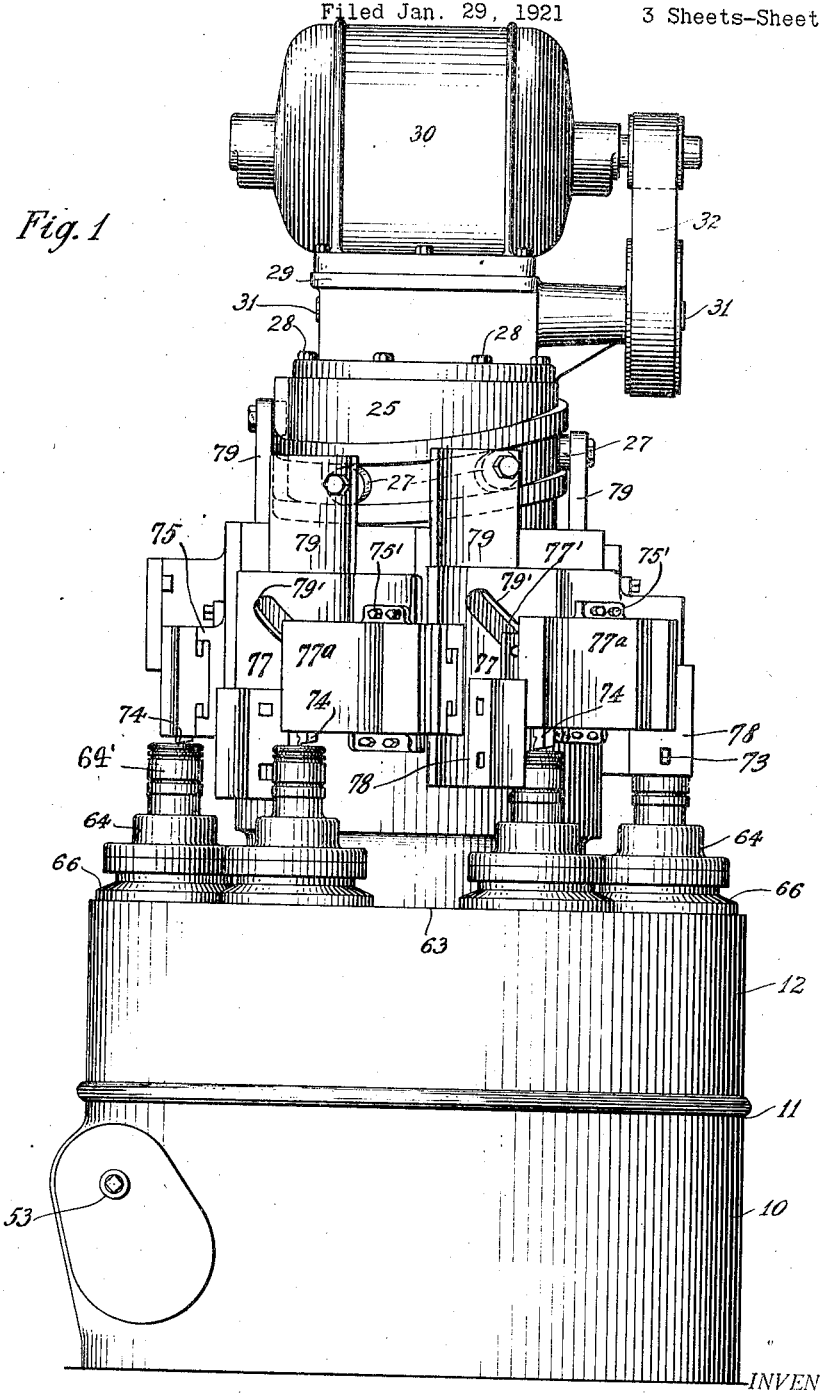

Referring in detail to the characters of reference marked upon the drawings, 10 represents the base of the machine, the outer wall of which is substantially cylindrical in form, and provided with a finished annular edge 11 over which an annular groove of the carrier 12 is fitted. The base further includes internal cross ribs 13 and a suitable supporting frame 14 for the two driving shafts 15 and 16, and the ball bearings 17 for the carrier. A central column 18 is secured to the frame work of the base by means of screw bolts 19 and is provided with an upper and lower peripheral bearing surfaces 21 and 22, respectively, upon which a correspondingly shaped cylindrical portion 23 of the carrier and cylindrical member 24 intermediate the driving gear and the work spindles are guided. A cylindrical member 25 is secured upon the upper end portion of the central column 18 by means of screw bolts 26 and upon its peripheral surface I provide a special form of cam groove to receive the rolls 27 for directing the movements of the tool slides as will later be described. Upon this cylindrical cam section 25 is secured by means of screw bolts 28, a super frame structure 29 upon which the driving motor 30 is secured for operating the machine. An intermediate shaft 31 is journalled in this upper frame 29, below, but parallel with, the motor shaft, from which it is driven, through the medium of a belt 32. Upon this shaft 31 is mounted a beveled pinion 33 that meshes with and drives a similar but preferably larger beveled pinion 34 upon the main driving shaft 15 positioned centrally in the machine and extending vertically through the length of the machine, having an upper bearing 36 in the upper frame structure 29 and a lower bearing 37 in the supporting frame 14 of the base.

Upon the lower end of the driving shaft is mounted a gear 38 that meshes with and drives a larger gear 39 secured to the short vertical shaft 16 journalled in suitable bearing 40 of the inner frame work 14 of the base. This shaft is provided upon its upper end with a pinion 41 for engaging an annular gear 42, for operating the spindle gears 43 later to be described. Upon the lower end portion of this shaft 16 is secured a beveled pinion 44 that meshes with and drives a similar beveled pinion 45 mounted upon a shaft 46 carrying a wheel 47 connected by means 48 to drive a similar wheel 49 upon a shaft 50 carrying a gear 51 that in turn meshes with the gear 52 mounted on a sleeve 53 upon a worm shaft 54. A clutch member 55 is also mounted on a sleeve and is engaged by a slidable clutch member 56 keyed to the same shaft. This worm shaft is suitably journaled in the base 10 of the machine and carries a worm 57 that meshes with and operates the large annular worm gear 58 attached to the base of the carrier for the purpose of continuously rotating the same as will later be described. The clutch member 56 mounted upon this worm shaft 54 is provided with an operating handle 59 by means of which the clutch upon the shaft may be engaged and disengaged with the driving clutch member for the purpose of stopping, starting and operating the carrier.

Figure 2:
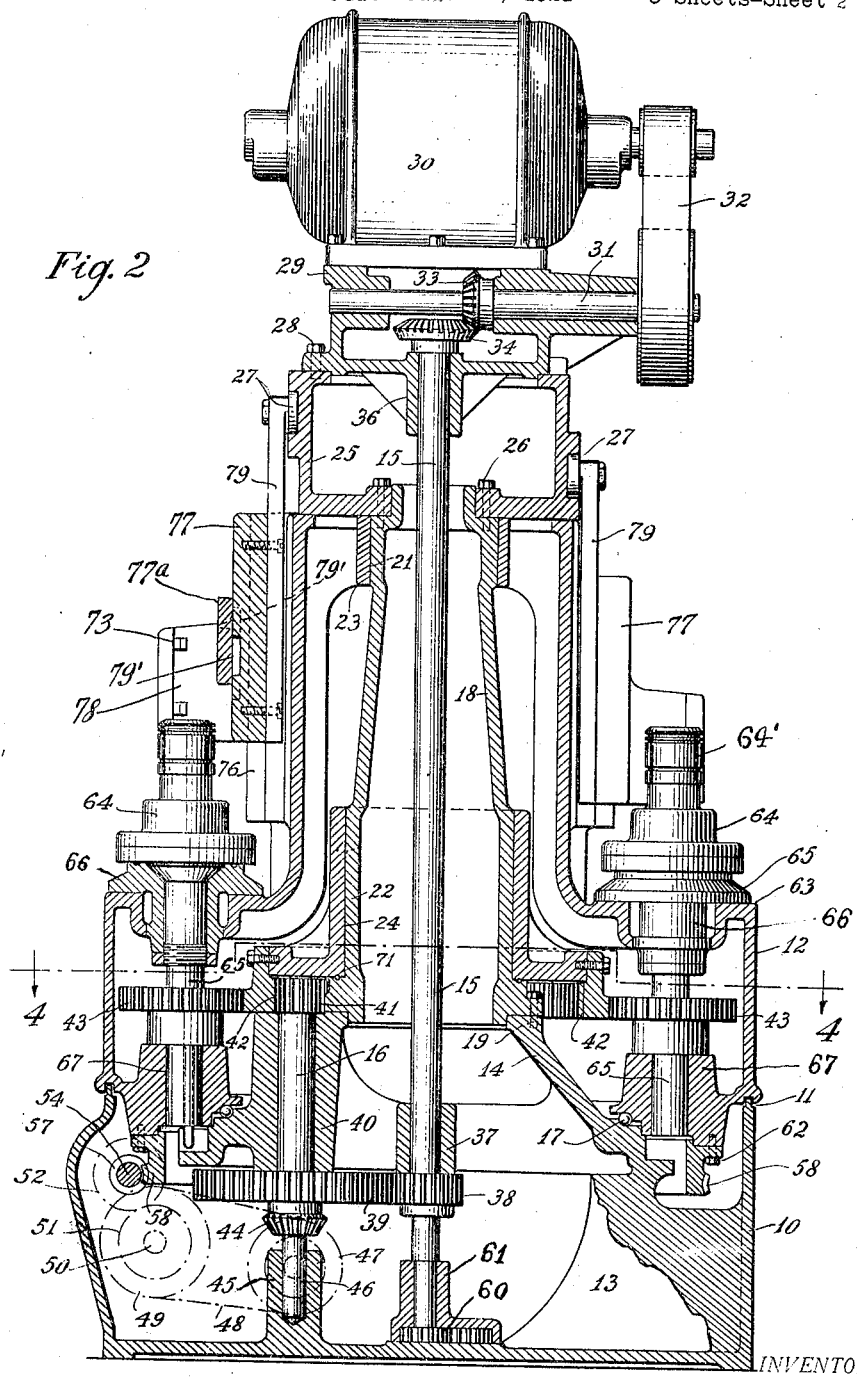
Fig. 2 is a central vertical sectional view taken on line 2—2 of Fig. 3.
Figure 3:
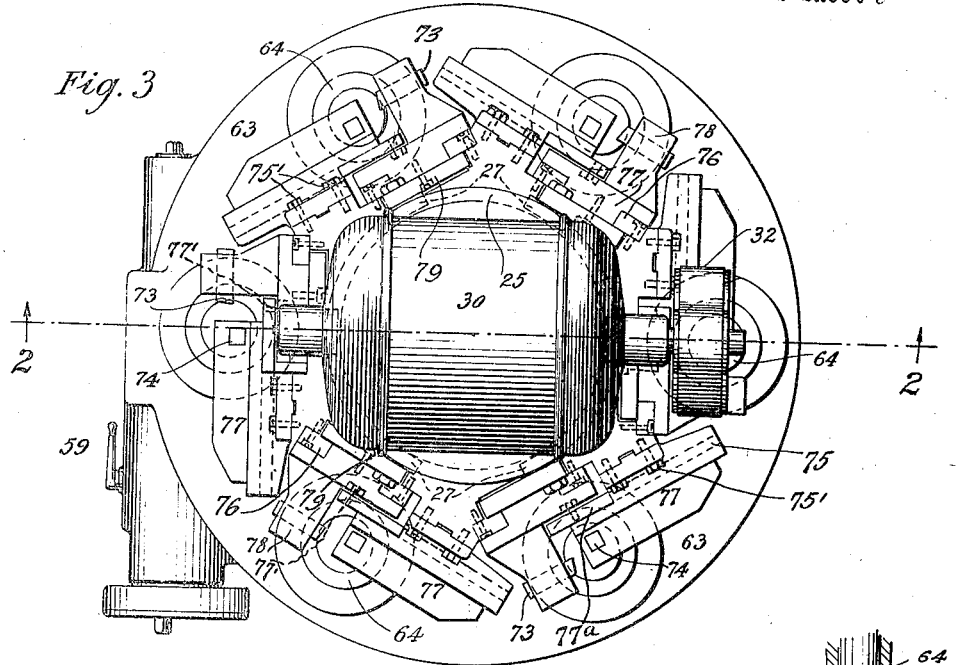
Fig. 3 represents a top plan view.

In Fig. 2 of the drawings, I have shown a simple form of oil pump 60 enclosed by a housing 61 connected with the extreme lower end portion of the driving shaft 16 but obviously forms no part of the invention.

So much of the machine already described is what might be termed a stationary part of the machine for supporting and operating the movable parts including the carrier, rotary work spindles and tool slides, mounted on the carrier, which will next be described.

For convenience in manufacture the large annular gear 58 is made separate from the carrier but is secured to the base of the carrier by means of screw bolts 62 so as to become a part thereof in a way to rotate the carrier with the rotation of the gear. The lower portion of the carrier as will be seen is of a considerably larger diameter than the upper portion and at the point of the difference in the two said diameters there is formed on the carrier an annular table 63, upon which the spindle bearings 66 are mounted to accommodate the spindles 65, work fixture 64 and work piece 64' carried thereon. These work spindles 65 are supported in upper bearings 66 fitted in the table of the carrier and in lower bearings 67 formed in the lower portion of the carrier to which the large gear is attached. The carrier is supported and operates on the bearing 17 of the base and further includes an upper bearing 21 around the upper portion of the column so as to insure a more rigid upper structure. The annular apron of the carrier includes a groove that covers the annular edge 11 of the base. Each of the spindles 65 is provided with a gear 43 that meshes with and is driven by the large annular gear 68 operated through internal gear 42 by the pinion 41.

Figure 5:
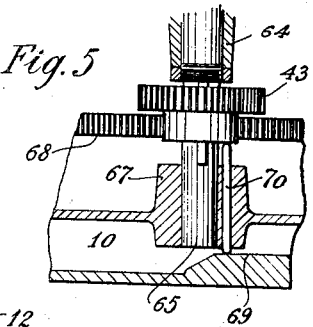
Fig. 5 shows a detail sectional elevation of the work spindle gear-lifts as seen from the left in Fig. 2.
Figure 4:
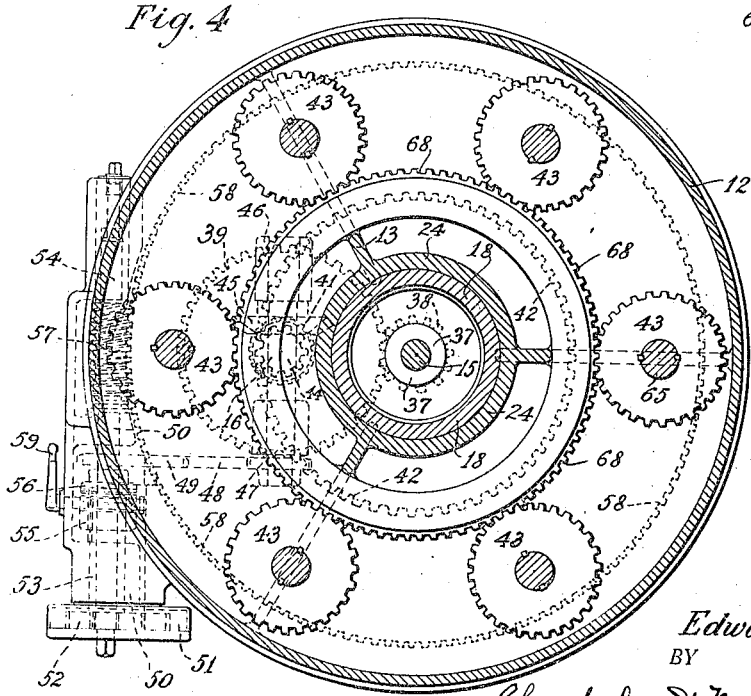
Fig. 4 shows a sectional plan view taken on line 4—4 of Fig. 2.

In order that the work spindles 65 may be brought to a position of rest upon the carrier as they come to the loading station, I provide automatic means for disconnecting the drive to the spindles, as is clearly shown in Figs. 2 and 5, which consists in providing a fixed cam 69 on the framework of the base, for engagement by the vertical pins 70 slidably mounted in the bearings 67 of the carrier 12 and adjacent to each spindle, and in position to engage the said cam with each rotation of the carriers. The upper end of each of the slidable pins rest against the under side of the hub of one of the gears 43 keyed to the spindles, for the purpose of lifting the same out of engagement with the large annular gear 68 at such times as when the pin is lifted by engagement with the cam.

This intermediate combined internal and external gear is secured to a bearing or hub member 24 by means of screw bolts 71 and has its bearing upon a shoulder 72 of the column 18 and is thus susceptible of an independent rotary movement and adapted for rotary movement upon the column independent of the rotary movement of the carrier. This double gear takes its movement upon the inside from the single shaft 16 and its pinion 41, and distributes the drive through the large outer gear 68, to the several spindle gears 43 of which six are shown in the drawings.

It will be understood that the work to be performed by this particular type of machine must necessarily be of a cylindrical character and may be secured to the spindles by any suitable form of fixture best adapted for holding the particular style and size of work. The work therefore rotates with the spindles while the tools and saddles are provided with necessary feeding movements. The cutting tools which I will designate as 73 and 74 are carried by the tool slides 77 and 77ª respectively, the slide 77 being mounted to move vertically in ways 76 to impart vertical movement to the cutting tool 73 and to impart horizontal movement to the horizontal tool slide 77ª. In the drawings 75 represents a fixed saddle, that is secured to the column of the machine by screw bolt 75′, to carry the horizontal movable tool slide 77ª. 78 represents an extension of the vertical tool slide 77, for carrying the cutting tool 73. The tool slides thus carry several cutting tools to simultaneously operate upon different portions of the work mounted upon the spindle. Each of the vertical slides 77 are provided with an attached upwardly disposed arm 79 upon the inner face of which is mounted the roll 27 for engagement with the before mentioned annular cam groove formed in the face of the stationary cylindrical member 24 mounted upon the top of the pedestal 18. The pitch of the cam groove referred to may obviously be varied according to the particular type of work to be performed. As shown it is shaped to form a gradual downward and quick return feed of the tool for the major portion of the operation of the carrier and further to produce a short dwell, or idle portion of the feed slides during the unloading and loading of the work. Horizontal movement is imparted to the tool slide 77ª by means of a roll 77′ carried on the inner side of said tool slide 77ª and engaged by a cam slot 79′ in the vertical tool slide 77, and whereby the vertical movements of said vertical slide will cause the horizontal slide to move horizontally.

The machine is operated through the central driving shaft from the motor, and in practice may be continuously driven while the motor is operated. The starting and stopping of the productive work of the machine is ordinarily controlled by the clutch lever heretofore referred to, which as will be understood controls the movement of the carriage and spindles and tool slides carried thereon. It will further be apparent that the driving shaft 16 drives the double gear upon the columns 18 for the purpose of operating the spindles, and the spindles and slides are all carried together around the column with the carrier so that all may be operating at the same time, except those positioned at the loading station. It will further be obvious that the carrier does not at any time come to a stop but is continuously driven; therefore no loss of time and production. Furthermore, the work is removed and reset upon the spindles at a time when both the slides and spindles are out of action.

By reason of the continuous operation of the machine in the manner suggested there is no lost movements in the operation of the machine or loss of time and production, there are at least five pieces of work in the machine at all times upon which operations are being performed and at each complete rotation of the carrier there are six pieces of work produced. Each spindle and its co-acting tool slide performs all the required operations upon a particular piece of work, and the work is not carried from one set of tools to another in order to have the several required operations performed thereon.

Having thus fully described the invention, what I claim and desire to secure by Letters Patent is:

1. A continuous turning machine of the class described including a rotor carrying a circular series of individually rotatable work holders, and a circular series of non-rotatable tool holders, and power means for causing a vertical and horizontal reciprocation of the tool holders.

2. A continuous turning machine of the class described including a rotor carrying a circular series of individually rotatable work holders, and a circular series of non-rotatable tool holders each comprising a vertically movable tool holding member carrying one tool, a vertically operable separate tool holding member movably mounted on the vertically movable tool holding member and carrying a transversely operable second tool.

3. A continuous turning machine of the class described including a rotor carrying a circular series of rotatable work holders, a circular series of non-rotatable tool holders, each tool holder carrying separate tools which respectively are feedable vertically and cross-wise.

4. A continuous turning machine of the class described including a rotor carrying a circular series of individually rotatable work holders, and a circular series of non-rotatable tool holders, each tool holder consisting of an automatically reciprocated tool holding member carrying one tool and a separate tool holding member mounted on the said reciprocated tool holding member and carrying a second tool disposed at an angle to the first mentioned tool.

5. A continuous turning machine of the class described including a rotor carrying a circular series of individually rotatable work holders, and a circular series of non-rotatable tool holders, each tool holder consisting of a vertically reciprocated tool holding member carrying one tool and a separate tool holding member mounted on the reciprocated tool holding member for movement in a direction at an angle thereto and carrying a second tool.

6. A continuous turning machine of the class described including a rotor carrying a circular series of individually rotatable work holders having means for supporting and carrying all of the work pieces in the same horizontal plane, said rotor also carrying a circular series of non-rotatable tool holders having means for removably and interchangeably holding tools, each work holder being paired with one tool holder and all of the paired work and tool holders operating on like articles, and means for rotating the rotor to provide for the synchronous rotation of the paired work and tool holders.

7. In a multiple spindle machine, a base, a carrier mounted to rotate thereon, work spindles mounted in the carrier, means for rotating the carrier and its work spindles, tool slides adapted to operate in conjunction with the work spindles, means carried by the base for actuating the tool slides while the carrier is rotating, and means for stopping rotation of the carrier and operation of the tool slides while the work spindles are rotating.

8. In a multiple spindle machine, a base, a carrier mounted to rotate thereon, work spindles mounted in the carrier, a tool slide for each work spindle, means for simultaneously rotating the carrier upon the base, rotating the work spindles in the carrier, and actuating the tool slides, and means for bringing the carrier and slides to a position of rest while the work spindles are still rotating.

9. In a multiple spindle machine, a base, a carrier mounted to rotate thereon, a series of rotatable work spindles mounted in the carrier, a corresponding number of tool slides mounted upon the carrier and having operative connection with the base, means for rotating the carrier, for rotating the work spindles, and for actuating the tool slides, and means upon the base for bringing the carrier and slides to a position of rest while the spindles are still rotating.

10. In a multiple spindle machine, a base, a carrier mounted to rotate thereon, work spindles adapted to rotate in the carrier, means for rotating the carrier upon the base and for rotating the spindles in the carrier, a tool slide adapted to cooperate with each work spindle, and means for actuating said tool slide while said carrier and work spindles are rotating.

11. In a multiple spindle machine, a base, a carrier mounted to rotate thereon, work spindles adapted to rotate in the carrier, means for rotating the carrier upon the base and for rotating the work spindles in the carrier, and a tool slide adapted to cooperate with each work spindle, said tool slides arranged upon the carrier and operatively engaging the base in such manner that they will be actuated while the carrier and its work spindles are rotating.

12. In a multiple spindle machine, a base, a carrier mounted to rotate thereon, work spindles adapted to rotate in the carrier, means for rotating the carrier upon the base and for rotating the work spindles in the carrier, a tool slide adapted to cooperate with each work spindle, said tool slides arranged upon the carrier and operatively engaging the base in such manner that they will be actuated while the carrier is rotating, and means whereby the carrier and tool slides may be brought to a position of rest while the work spindles are rotating.

13. In a multiple spindle machine, a base, a carrier mounted to rotate thereon, means carried by the base and adapted to rotate the carrier, work spindles mounted in the carrier, means for rotating the work spindles, tool slides upon the carrier and adapted to operate in conjunction with the work spindles, and a cylindrical cam supported upon the base for actuating the tool slides.

14. In a multiple spindle machine, a base, a cylindrical cam supported thereon, a carrier mounted upon the base, means for rotating the carrier, work spindles in the carrier, means for rotating the work spindles, and a tool slide for each work spindle, said tool slides arranged upon the carrier and having engagement with the cam, whereby the tool slides will be actuated when the carrier is rotating.

15. In a multiple spindle machine, a base, a cylindrical cam supported thereon, a carrier mounted upon the base, means for rotating the carrier, work spindles in the carrier, means for rotating the work spindles, a tool slide for each work spindle, said tool slides arranged upon the carrier and each having engagement with the cam of the base, whereby all of the tool slides will be simultaneously operated when the carrier and its work spindles are rotating.

16. In a multiple spindle machine, a base, a carrier mounted to rotate thereon, work spindles upon the carrier, means for rotating the carrier upon the base and for rotating the work spindles in the carrier, a tool slide adapted to cooperate with each work spindle, said tool slides arranged upon the carrier, a fixed cam with which all of said tool slides are operatively connected, and means for actuating the tool slides, said means comprising the rotation of said carrier and the operative connections between said slides and cam.

17. In a multiple spindle machine, a base, a carrier mounted to rotate thereon, work spindles upon the carrier, means for rotating the carrier upon the base and for rotating the work spindles in the carrier, a tool slide adapted to cooperate with each work spindle, said tool slide arranged upon the carrier, a fixed cam with which all of said tool slides are operatively connected, means for actuating the tool slides, said means comprising the rotation of said carrier and the operative connections between said slides and cam, and means whereby the carrier and tool slides can be brought to a position of rest while the work spindles are rotating.

18. In a multiple spindle machine, a base, a carrier mounted to rotate thereon, work spindles upon the carrier, means for rotating the carrier upon the base and for rotating the work spindles in the carrier, a tool slide adapted to cooperate with each work spindle, said tool slides arranged upon the carrier, a fixed cam upon the base and having operative connection with all of said tool slides, whereby said tool slides will be simultaneously actuated when said carrier is rotating.

19. In a multiple spindle machine, a series of rotatable work spindles, a series of tool slides to function in connection with the work spindles, a carrier for supporting all of said work spindles and tool slides, a fixed cam for actuating the tool slides, and a base upon which the cam is located and the carrier rotates.

20. In a multiple spindle machine, a series of rotatable work spindles, a tool slide for each work spindle, a carrier upon which all of said work spindles and tool slides are arranged, a base upon which the carrier rotates, and a fixed cam operatively connected with all of the tool slides to actuate the same when said carrier is rotating.

21. In a multiple spindle machine, a series of rotatable work spindles, a series of tool slides to function in connection with the work spindles, a carrier for supporting all of said work spindles and tool slides, a fixed cam for actuating the tool slides, operative connections between said cam and slides, and a base upon which the cam is located and the carrier rotates.

22. In a multiple spindle machine, a series of rotatable work spindles, a series of tool slides to function in connection with the work spindles, a carrier upon which said spindles and slides are arranged, a base upon which the carrier rotates, a fixed cylindrical cam upon the base, and operative connections between said cam and all of said slides whereby said tool slides will be actuated when said carrier rotates.

23. In a multiple spindle machine, a base, a carrier mounted to rotate thereon, work spindles mounted to rotate in said carrier, means for rotating the carrier, and means for rotating the work spindles, said last mentioned means including a gear having internal and external teeth, said internal teeth receiving their power from a main driving shaft and said external teeth meshing with gears upon each of said work spindles.

24. In a multiple spindle machine, a base, a carrier mounted to rotate thereon, work spindles mounted to rotate in said carrier, gears upon the work spindles, a cylindrical member mounted upon the base to have rotary movement independent of said carrier, said cylindrical member including a gear having internal and external teeth, said external teeth adapted to mesh with each of said gear spindles, and a rotating pinion upon said base and adapted to engage said internal teeth to rotate said cylindrical member upon said base.

25. In a multiple spindle machine, a base, a carrier mounted to rotate thereon, work spindles mounted to rotate in said carrier, an annular worm gear upon the carrier and adapted to receive its power from a main driving shaft to rotate said carrier, and means for rotating said spindles, said last mentioned means including a gear carried by each spindle, a rotatable pinion upon said base, and a gear mounted to have independent rotation upon said base, said gear having internal teeth adapted to be engaged by said pinion and external teeth adapted to mesh with all of said spindle gears.

26. In a multiple spindle machine, a base, a carrier mounted to rotate thereon, work spindles mounted to rotate in said carrier, means for rotating the carrier, said means including an annular worm gear attached to the carrier and adapted to be engaged by a worm receiving its power from a main driving shaft, and means for rotating the work spindles, said means including a gear rotatably supported by the base and having internal teeth adapted to be engaged by a rotatable pinion in the base, and external teeth adapted to mesh with a gear upon each of said work spindles.

27. In a multiple spindle machine, a base, a carrier mounted to rotate thereon, work spindles mounted to rotate in said carrier, and means for rotating said work spindles, said means including a rotatable pinion arranged in said base, and a gear having internal teeth, said internal teeth adapted to be engaged by said pinion, and said external teeth adapted to mesh with a gear upon each of said work spindles.

28. In a multiple spindle machine, a base, a carrier mounted to rotate thereon, work spindles mounted to rotate in said carrier, means for continuously rotating the carrier, said means including a worm gear attached to the carrier a worm supported on the base, a main driving shaft, a fixed and a movable clutch member arranged between said worm and main driving shaft whereby said carrier can be disconnected from the continuous rotating means, and means for rotating said work spindles while said carrier is in stationary position.

29. In a multiple spindle machine, a base, a carrier mounted to rotate thereon, work spindles mounted to rotate in said carrier, a tool slide for each work spindle and upon the carrier, said tool slides operatively connected with said base to be actuated when said carrier is rotated, a gear carried by each work spindle, a gear rotatably mounted upon said base and having externally arranged teeth adapted to mesh with all of said spindle gears and also provided with internally arranged teeth, a rotatable pinion in said base adapted to rotate said gear upon said base to drive said work spindles, and an annular worm gear upon said carrier and adapted to be engaged by a rotatable worm on said base to rotate said carrier.

30. In a multiple spindle machine, a base, a carrier mounted to rotate thereon, work spindles mounted to rotate in said carrier, a tool slide for each work spindle and upon the carrier, a cam on said base and adapted to actuate said tool slides when said carrier is rotated, a gear upon each work spindle, a gear independently rotatable upon said base, having internally and externally arranged teeth, said externally arranged teeth adapted to mesh with all of said spindle gears, a rotatable pinion in said base adapted to rotate said gear upon said base to drive said work spindles, an annular worm gear upon said carrier and adapted to be engaged by a rotatable worm on said base to rotate said carrier, and means for stopping rotation of the carrier and actuation of the tool slides while the work spindles are continuously driven.

31. In a multiple spindle machine, a base, a carrier mounted to rotate thereon, work spindles mounted to rotate in said carrier, a tool slide for each work spindle and upon the carrier, a cam on said base and adapted to actuate said tool slides when said carrier is rotated, a gear upon each work spindle, a gear independently rotatable upon said base, having internally and externally arranged teeth, said externally arranged teeth adapted to mesh with all of said spindle gears, a rotatable pinion in said base adapted to rotate said gear upon said base to drive said work spindles, an annular worm gear upon said carrier and adapted to be engaged by a rotatable worm on said base to rotate said carrier, and means for stopping rotation of the carrier and actuation of the tool slides while the work spindles are continuously driven, said means including a fixed and a movable clutch associated with said rotatable worm and a handle for operating said movable clutch.

32. A mechanism as specified in claim 30 wherein the rotatable pinion and rotatable worm receive their power from a single driving unit.

33. In a multiple spindle machine, a base, a carrier rotatably mounted thereon, a series of rotatable work spindles mounted in the carrier, a corresponding number of tool slides also mounted upon the carrier to operate in conjunction with the work spindles, means for continuously driving the carrier, and means for successively bringing each work spindle to a position of rest while the carrier is rotating.

34. In a multiple spindle machine, a base, a carrier rotatably mounted thereon, a series of rotatable work spindles mounted in the carrier, a corresponding number of tool slides also mounted upon the carrier to operate in conjunction with the work spindles, means for continuously driving the carrier, and means for successively bringing each work spindle to a position of rest while the carrier is rotating, said means comprising a cam fixed upon the frame work of the base for engaging mechanism adapted to remove each work spindle from the effect of its driving means when said carrier rotates to position said work spindle adjacent said cam.

35. In a multiple spindle machine, a base, a carrier mounted to rotate thereon, work spindles mounted in the carrier, a tool slide for each work spindle, means for simultaneously rotating the carrier upon the base, rotating the work spindles in the carrier, and actuating the tool slides, and means for successively bringing each work spindle and its tool slide to a position of rest while the carrier is rotating.

Signed at Bridgeport, in the county of Fairfield and State of Connecticut, this 24th day of January A. D., 1921.

EDWARD P. BULLARD, Jr.